United States Patent [19]

Kemerer et al.

[11] Patent Number: 5,548,203
[45] Date of Patent: Aug. 20, 1996

[54] CAPACITOR POLARITY-BASED VAR CORRECTION CONTROLLER FOR RESONANT LINE CONDITIONS AND LARGE AMPLITUDE LINE HARMONICS

[75] Inventors: Ray S. Kemerer; Martin J. Norman, both of Monroeville, Pa.

[73] Assignee: Electric Power Research Institute, Inc., Palo Alto, Calif.

[21] Appl. No.: 269,165

[22] Filed: Jun. 29, 1994

[51] Int. Cl.$^6$ ..................................................... G05F 1/70
[52] U.S. Cl. ............................................. 323/210; 323/208
[58] Field of Search ..................................... 323/205, 208, 323/209, 210, 218, 219

[56] References Cited

U.S. PATENT DOCUMENTS

| | | | |
|---|---|---|---|
| 4,000,455 | 12/1976 | Gyugyi et al. | 323/119 |
| 4,063,301 | 12/1977 | Lye | 361/88 |
| 4,068,159 | 1/1978 | Gyugyi | 323/119 |
| 4,172,234 | 10/1979 | Gyugyi et al. | 323/119 |
| 4,188,573 | 2/1980 | Gyugyi et al. | 323/119 |
| 4,204,151 | 5/1980 | Guygyi et al. | 323/119 |
| 4,210,860 | 7/1980 | Rosa et al. | 323/119 |
| 4,234,843 | 11/1980 | Guygyi et al. | 323/119 |
| 4,296,462 | 10/1981 | Gurr | 363/96 |
| 4,307,331 | 12/1981 | Guygyi | 323/210 |
| 4,319,329 | 3/1982 | Girgis et al. | 364/484 |
| 4,353,024 | 10/1982 | Gyugyi | 323/211 |
| 4,356,441 | 10/1982 | Putman et al. | 323/210 |
| 4,358,729 | 11/1982 | Hart | 323/322 |
| 4,437,052 | 3/1984 | Gyugyi | 323/210 |
| 4,438,386 | 3/1984 | Gyugyi | 323/210 |
| 4,451,777 | 5/1984 | Gyugyi | 323/210 |
| 4,555,659 | 11/1985 | Gyugyi | 323/210 |
| 4,561,059 | 12/1985 | Davis et al. | 364/477 |
| 4,571,535 | 2/1986 | Gyugyi | 323/211 |
| 4,638,238 | 1/1987 | Gyugyi et al. | 323/211 |
| 4,672,555 | 6/1987 | Hart et al. | 364/483 |
| 4,686,447 | 8/1987 | Takeda et al. | 323/210 |
| 4,719,402 | 1/1988 | Brennen et al. | 323/211 |
| 4,811,236 | 3/1989 | Brennen | 364/483 |
| 4,891,570 | 1/1990 | Nakamura et al. | 323/210 |
| 4,891,571 | 1/1990 | Wong | 323/322 |
| 5,305,242 | 4/1994 | Noriyoshi et al. | 364/602 |
| 5,329,221 | 7/1994 | Schauder | 323/207 |
| 5,402,058 | 3/1995 | Larsen | 323/211 |

Primary Examiner—Matthew V. Nguyen
Attorney, Agent, or Firm—Flehr, Hohbach, Test, Albritton & Herbert

[57] ABSTRACT

The invention is a static VAR compensator (SVC) which provides optimized power factor correction in the presence of resonant line conditions and large amplitude harmonics. A gate drive signal is applied to the solid state devices of the SVC during only a minor fraction of the fundamental cycle to prevent damage to the solid state devices and the capacitors of the SVC, otherwise caused by resonant line conditions or large amplitude harmonics. This relatively short gate drive signal, in the presence of large amplitude harmonics, will force the solid state electronic components to turn-off prematurely. As a result, the capacitors of the SVC provide incomplete reactive power compensation. Feedback from a capacitor polarity circuit is used to determine switched capacitor status at a specific instant in each cycle. A VAR correction controller, responsive to the feedback, executes a control scheme to account for incomplete reactive power compensation.

20 Claims, 11 Drawing Sheets

CAPACITOR POLARITY-BASED VAR CORRECTION CONTROLLER FOR RESONANT LINE CONDITIONS AND LARGE AMPLITUDE LINE HARMONICS

BRIEF DESCRIPTION OF THE INVENTION

This invention relates generally to Static VAR Compensators (SVCs) used to condition power on a transmission line. More particularly, this invention relates to an SVC controller that relies upon a feedback signal from a capacitor polarity circuit to execute a control strategy in the presence of resonant line conditions and large amplitude line harmonics.

BACKGROUND OF THE INVENTION

Power electronic circuits are used to control and condition electric power. For instance, power electronic circuits may be used to convert a direct current into an alternating current, to change voltage or current magnitude, to change the frequency of an alternating current, or to provide Volt-Ampere Reactive (VAR) power conditioning.

VAR power conditioning, also called reactive power conditioning herein, is of increasing importance in view of the growing levels of reactive loads on AC power distribution systems. Reactive power conditioning systems must function properly in the presence of voltage and current distortions on the power system.

Voltage and current distortions are largely attributable to a growing number of nonlinear loads in the electric utility power network. Typical nonlinear loads are computer controlled data processing equipment, numerical controlled machines, variable speed motor drives, robotics, medical, and communication equipment.

Nonlinear loads draw non-sinusoidal currents instead of purely sinusoidal currents drawn by conventional linear loads. As a result, currents at frequencies other than the fundamental power frequency flow through the predominantly inductive source impedance of the electric supply network.

Presently, there are static VAR compensators (SVCs) in operation which utilize computers to process line voltage data and which use solid state switches to switch compensating capacitors onto the power line to provide reactive power compensation. Unfortunately, reactive power conditioning by switching capacitors onto the power line may produce resonant conditions. Specifically, since the source impedance of a power system is inductive, a resonant frequency exists with the source inductance when a compensating capacitor is switched onto the power line. This can result in a large resonant current in the compensating capacitor, particularly if a significant voltage harmonic is present at the resonant frequency. If the resonant condition is sustained, it can lead to capacitor damage or even semiconductor device damage within the SVC.

Aside from the problem of resonant capacitor currents, SVCs have difficulties dealing with system harmonics. System harmonics can cause the thyristors of an SVC to prematurely turn-off as soon as the gate-drives to the thyristors are removed.

In each AC power cycle, the thyristor switches are triggered to turn on when their anode-to-cathode voltage is zero and is increasing in the forward direction. As long as the current through the thyristors is positive, it remains in the conducting state, even after the trigger signal is removed. This normally occurs for half of every AC cycle of the applied voltage. If the anode-to-cathode voltage applied across the thyristor is not a single-frequency sinusoid, or close approximation thereof, the thyristor will turn off prematurely when positive anode-to-cathode current is not maintained. As a result, the capacitor in series with the thyristor will not conduct for the required full half-cycle of the fundamental frequency. This results in providing less than the full amount of capacitive reactance.

Existing technology attempts to eliminate the premature shut-off of thyristors by triggering them either continuously throughout the cycle or by repetitive pulsing, thereby forcing the thyristors to stay on over the full 180 degree conduction period. This continuous gate drive methodology increases the gate drive power dissipation to undesirable or unacceptable levels. In addition, if a large magnitude of high frequency current is allowed to flow continuously, excessive rms heating of the switched capacitors results, leading to capacitor failure.

Thus, it would be highly desirable to provide an SVC which is immune from the problem of resonant capacitor currents, does not rely upon continuous thyristor gate drive triggering, and provides appropriate reactive power conditioning, even in the presence of premature thyristor turn-off.

The implementation of any power conditioning strategy relies upon firing the solid state switches of an SVC at a specific time in each cycle. If the thyristors are not switched at the correct moment, the compensating capacitor may produce transients on the power line. For correctly timed compensating capacitor switching to occur, the firing system must be synchronized with the power line fundamental frequency. In order for this synchronization to be accomplished, an approach well-known in the art is to determine, with hardware circuitry, the zero-crossings of the fundamental frequency of the line voltage or current. The problem with this widely-used technique is that an unambiguous determination of the zero-crossing point is difficult when system harmonics and resonances are present. In such a case, more than one zero-crossing may occur during each cycle of the fundamental frequency.

The presence of line harmonics is growing with the increasing use of solid state power conversion equipment. The harmonic problem is especially troublesome for single-phase AC circuits, because the information available for determining the zero crossings in a three-phase power system is not available in a single-phase system.

Hardware filters can be employed to reduce the measured harmonic content in a power line signal. However, hardware filters introduce waveform lag into the control system. This lag is proportional to the amount of harmonic content which must be filtered. Thus, the response time of the firing system may become limited in systems where significant harmonics are present. Attempting to reduce the lag in the hardware filter will cause the detection of multiple zero crossings and could cause a firing of the capacitor switch at the wrong point, with attendant undesirable transients or power circuit damage.

Thus, it would be highly desirable to develop a system for accurately determining the proper instant at which to activate the switches of an SVC, a capacitor bank, or other application of fast solid state switches. The switch firing system should not be sensitive to line harmonics and should not rely upon hardware filters. In addition, it would be highly desirable to develop a solid state switch firing system that does not rely upon external synchronization signals to identify the fundamental of the line signal. Finally, it would be highly desirable to develop a solid state switch firing system that can operate on a single-phase system.

SUMMARY OF THE INVENTION

The invention is a static VAR compensator (SVC) which provides optimized power factor correction in the presence of resonant line conditions and large amplitude harmonics. A gate drive signal is applied to the solid state devices of the SVC during only a minor fraction of the fundamental cycle to prevent damage to the solid state devices and the capacitors of the SVC, otherwise caused by resonant line conditions or large amplitude harmonics. This relatively short gate drive signal, in the presence of large amplitude harmonics, will force the solid state electronic components to turn-off prematurely. As a result, the capacitors of the SVC provide incomplete reactive power compensation. Feedback from a capacitor polarity circuit is used to determine switched capacitor status at a specific instant in each cycle. A VAR correction controller, responsive to the feedback, executes a control scheme to account for incomplete reactive power compensation.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
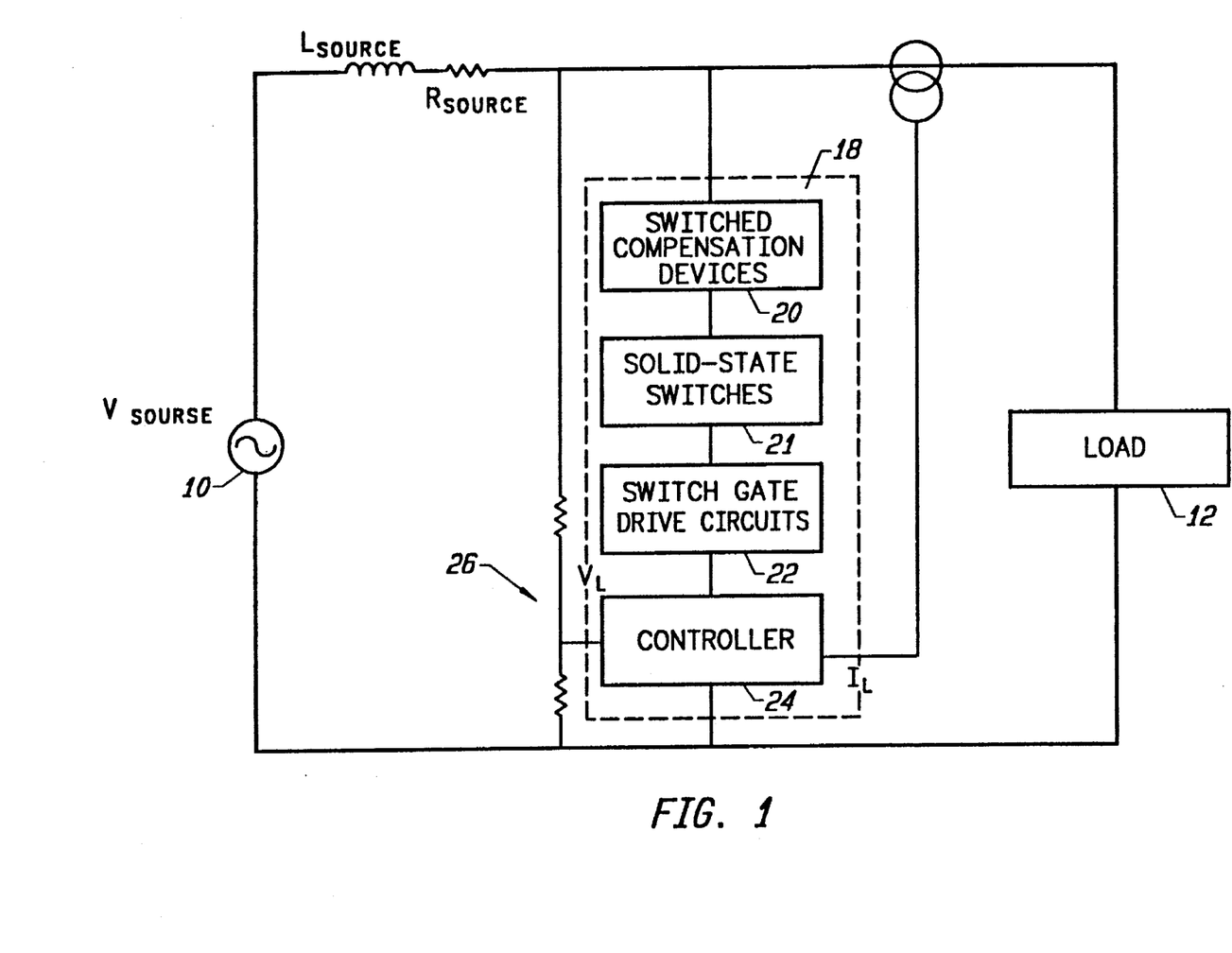
FIG. 1 is a general illustration of the SVC and controller of the invention.

FIG. 1 illustrates a voltage source 10 delivering power to a load 12 via power line 13. The power line 13 includes a source inductance $L_{source}$ and a source resistance $R_{source}$. The power on the power line 13 is conditioned with a Static Var Compensator (SVC) 18. The SVC 18 includes switched compensation devices 20, such as capacitors and inductors. The SVC 18 also includes solid state switches 21 for switching the switched compensation devices 20. Switch gate drive circuits 22 are used to drive the solid state switches 21. Switch gate drive circuits are generally known in the art. However, a particularly advantageous switch gate drive circuit is disclosed in the patent application entitled "Current Source Gate Drive Circuit for Simultaneous Firing of Thyristors", assigned to the assignee of the present invention, and filed on the same day as the present invention, and given Ser. No. 08/267,860. The latter application is expressly incorporated by reference herein.

The SVC 18 also includes a controller 24 in accordance with the present invention. As will be fully described below, the controller 24 primarily has two novel aspects. The first novel aspect of the controller relates to the power conditioning strategy that it executes in the presence of resonant line conditions and large amplitude harmonics. The second novel aspect of the SVC controller relates to a firing system for solid state devices. Specifically, the firing system accurately fires solid state devices pursuant to a self-synchronization technique. That is, the firing system does not rely upon an external synchronization signal to identify the line fundamental. In addition, the firing system is insensitive to line harmonics, yet does not rely upon hardware filters. These novel aspects of the controller 24 of the invention will be discussed in detail below. At the present time, attention turns to an example of switched compensation devices 20 and solid state switches 21 that may be used in accordance with the invention.

Figure 2:
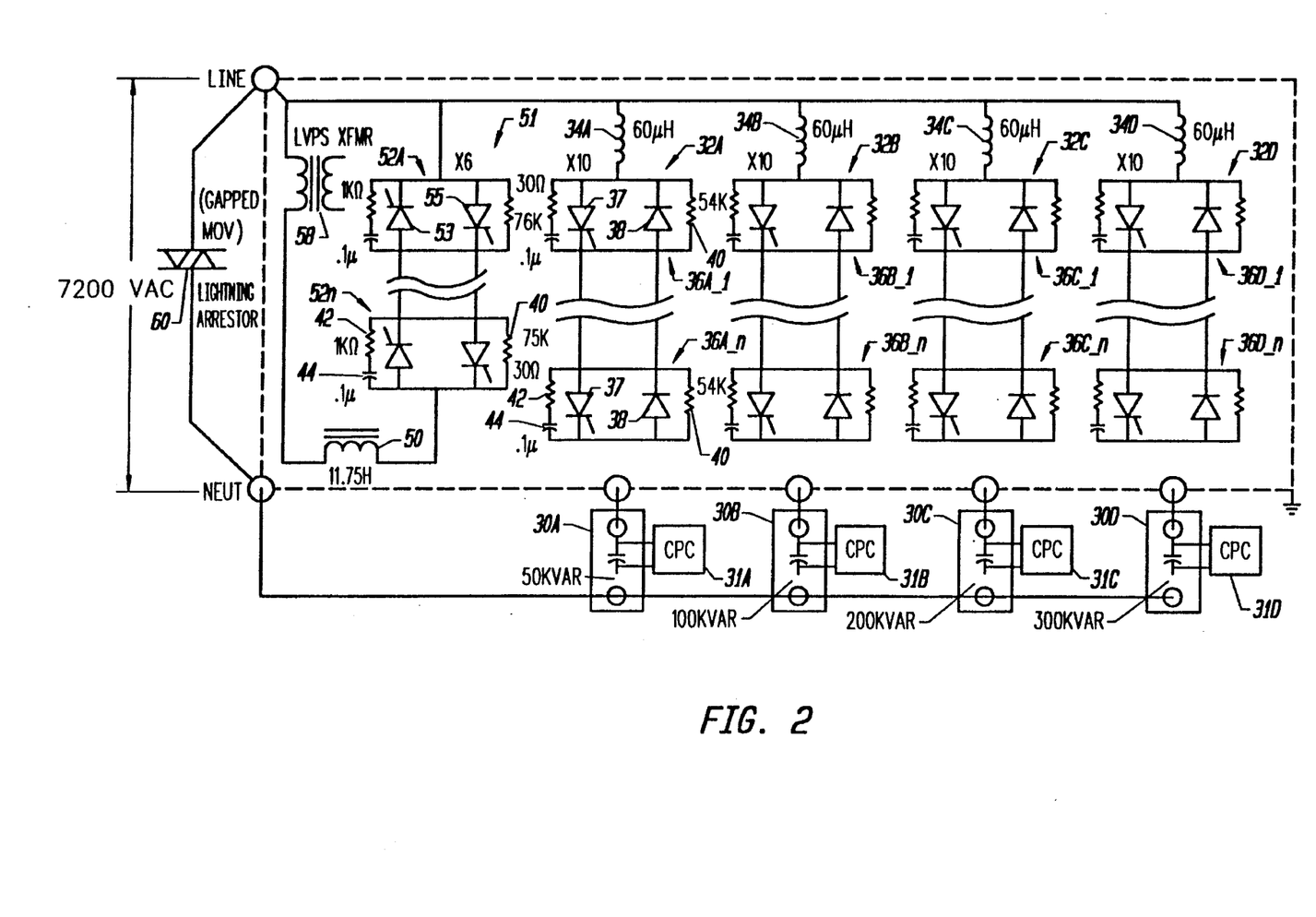
FIG. 2 is an example of switched compensation devices and solid state switches that may be used in conjunction with the SVC of FIG. 1.

The apparatus of FIG. 2 merely serves to illustrate the operation of the invention. The invention is not limited to the specific embodiment disclosed in FIG. 2.

FIG. 2 illustrates a number of compensating capacitors 30A, 30B, 30C, and 30D of an SVC 18. The compensating capacitors 30 and the compensating reactor 50 constitute the switched compensation devices 20. Each compensating capacitor has a corresponding capacitor polarity circuit 31. As will be described below, the capacitor polarity circuits 31A, 31B, 31C, and 31D are used to identify the premature termination of a capacitive reactance power compensation cycle. This information is then utilized by the controller 24, in selected circumstances, to provide additional capacitive reactance power compensation in a subsequent cycle to adjust for any shortfall.

Series thyristor strings 32A, 32B, 32C, and 32D are, in this example the solid state switches 21, used to switch the respective compensating capacitors. Preferably, each series thyristor string 32 includes an isolating inductor 34, to limit in-rush current.

Each series thyristor string 32 includes a number of opposing thyristor-diode pairs 36A_1 through 36A_N. Each opposing thyristor-diode pair 36 includes a thyristor 37 in an opposing parallel relation with a diode 38. The diodes 38 allow the charging capacitors 30 to negatively charge each cycle. Preferably, each opposing thyristor-diode pair 36 includes a current leakage resistor 40 in a parallel branch and a snubber branch resistor 42 and a snubber branch capacitor 44 in another parallel branch. The current leakage resistors compensate for the variation in semiconductor leakage currents so that each thyristor-diode pair in the string will support a nearly equal share of the system voltage. The snubber branch resistor 42 and the snubber branch capacitor 44 are used to process the inherent recovered charge of a thyristor and thereby insure that all thyristors 53 of a thyristor string 32 shut off at the same time.

The static VAR compensator 18 may also include a compensating reactor 50 that has a corresponding thyristor string 51. The thyristor string 51 includes a number of opposing thyristor pairs 52A through 52N. Each opposing thyristor pair includes a first thyristor 53 and an opposing parallel thyristor 55. The static VAR compensator 18 may also include step-down voltage transformer 58 for line voltage sampling and a lightning arrestor 60. The step-down voltage transformer 58 may be substituted with a voltage divider.

Figure 3:
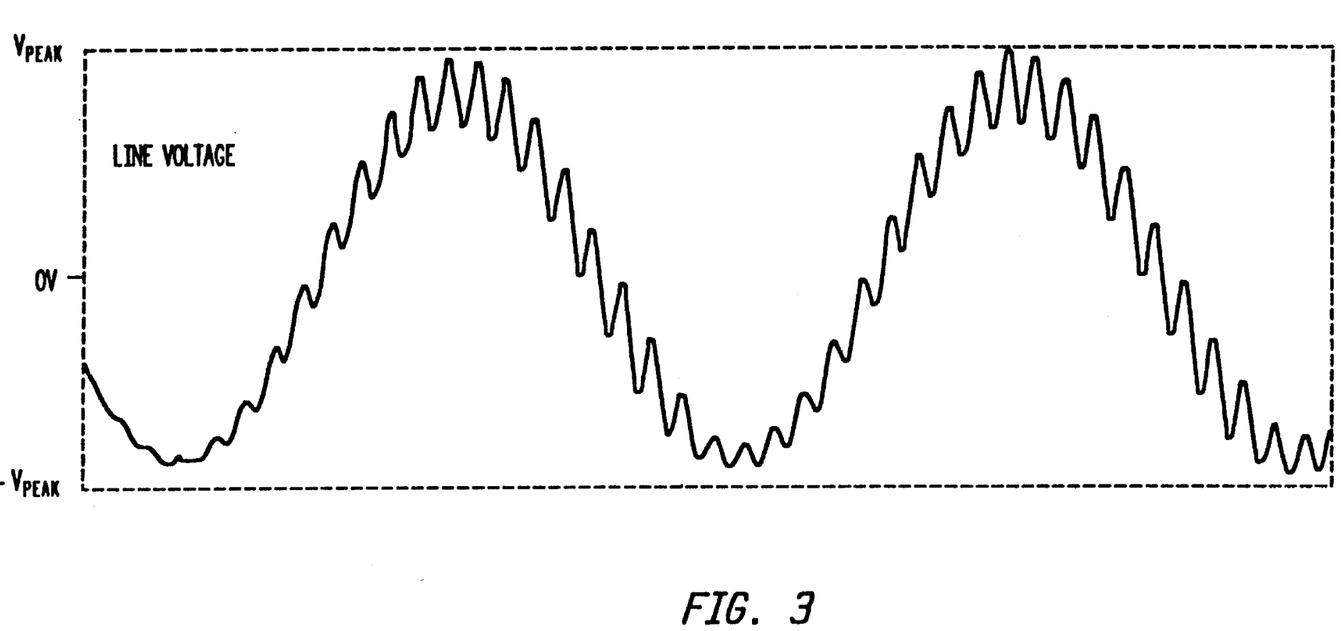
FIG. 3 is an illustration of a line voltage signal with a single high order harmonic.

Turning now to FIG. 3, illustrated therein is a line voltage signal that might be processed in accordance with the SVC 18 of the invention. FIG. 3 illustrates a line voltage signal with harmonic content. As previously indicated, this harmonic content can cause the thyristors of the SVC 18 to prematurely disconnect the reactive power conditioning elements of the SVC 18, thereby protecting the thyristors and capacitor from overheating, but also resulting in insufficient power conditioning compensation.

Figure 4:
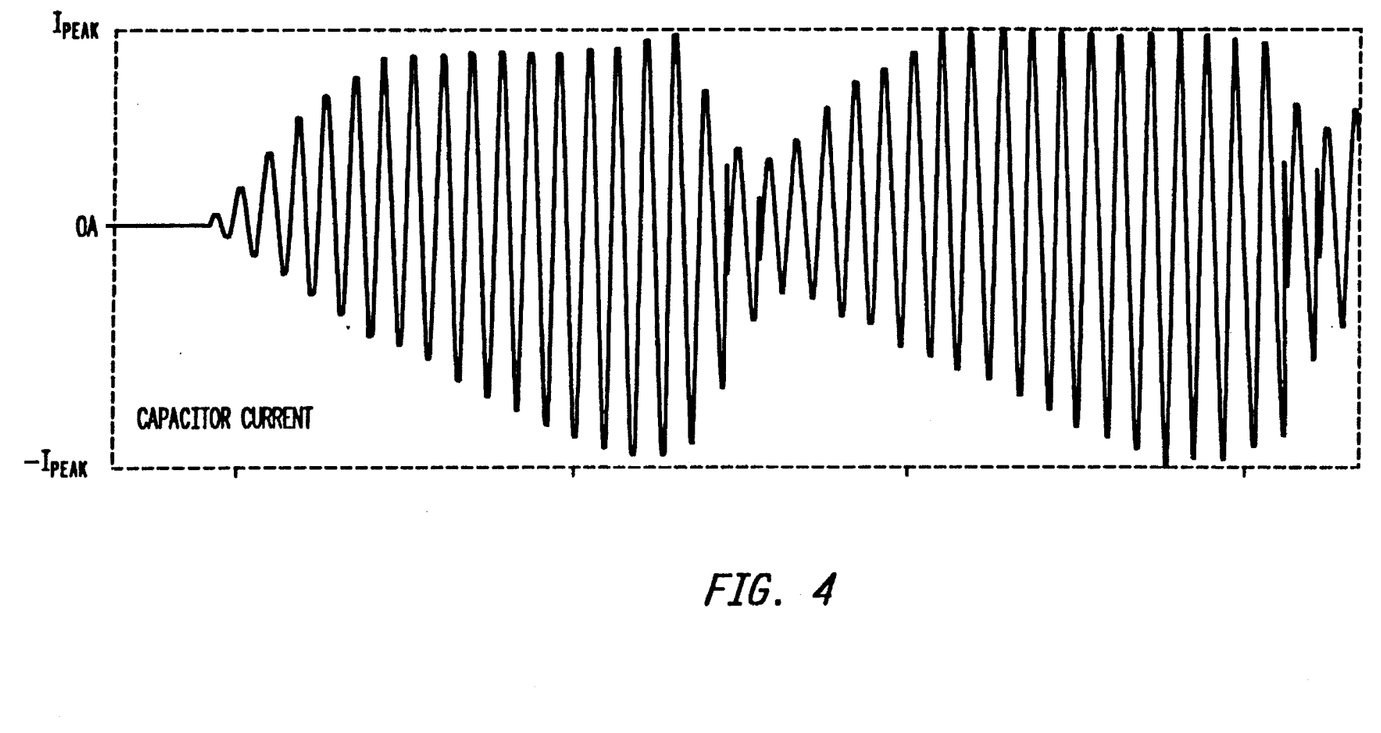
FIG. 4 illustrates a resonant current condition in a compensating capacitor of an SVC.

FIG. 4 illustrates a resonant current condition on a compensating capacitor of an SVC 18. For example, such a condition is created when a 100 kVAr capacitor (5 microfarads) is switched onto a 7200 volt power system with a series resonant circuit tuned to the 19th harmonic. Notice that the resonant current has a magnitude greater than the 60 hertz fundamental magnitude. In fact, the fundamental current is barely discernable because of the large resonant current. As previously indicated, a resonant current on a compensating capacitor can lead to capacitor damage or even semiconductor device damage within the SVC.

To avoid these problems, the controller 24 of the invention provides fractional gate drive signals to the solid state switches 21 for only a minor fraction of a cycle. As previously indicated, the prior art typically uses a gate drive signal for a complete half-cycle. The preferred embodiment of the present invention uses a fractional gate drive signal which is active between one-sixteenth (1/16) of a cycle and one-quarter (1/4) of a cycle, but preferably about one-eighth (1/8) of a cycle. For instance, a 2 milli-second gate drive is equal to approximately one-eighth (1/8) of a cycle on a 60 Hertz system. This allows the drive to be applied long enough to assure the thyristor remains on despite small amounts of harmonics, but not so long that the adverse consequence of over-driving through resonances or excessive harmonics can be experienced.

Figure 5:
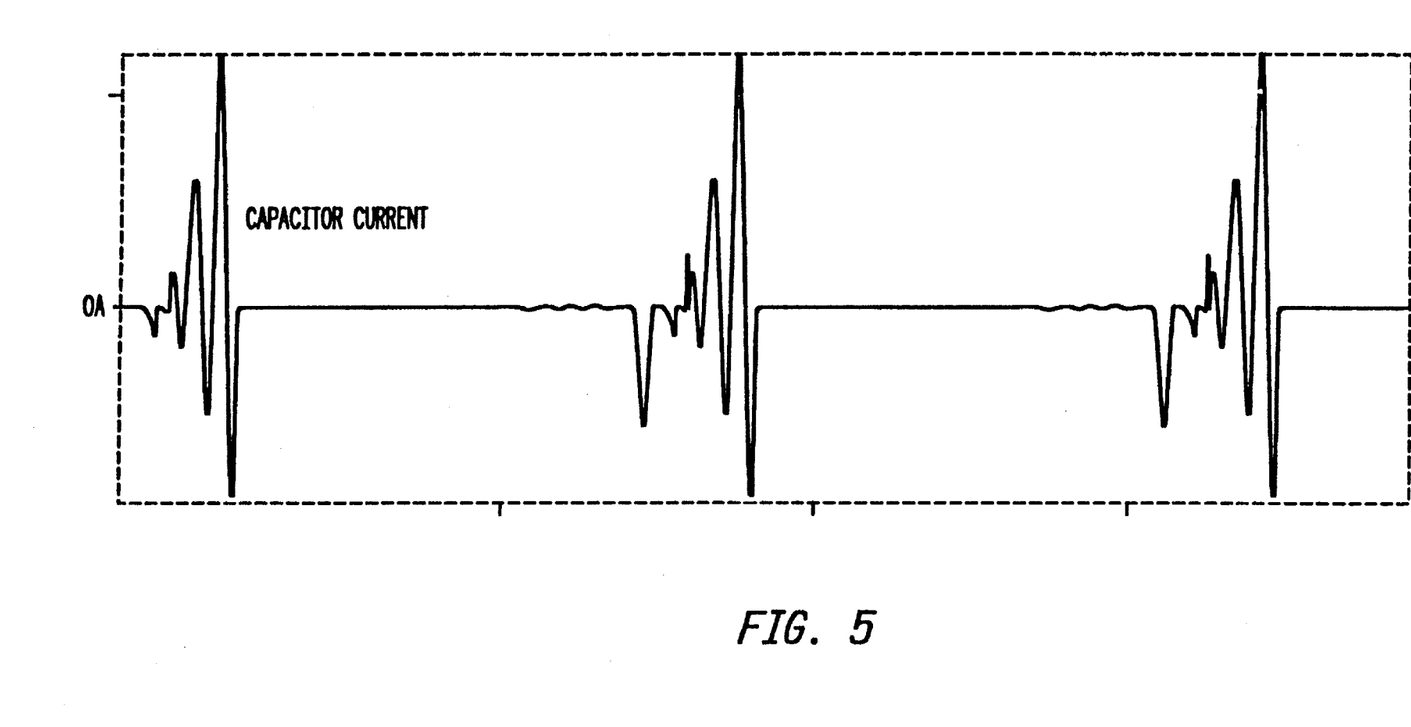
FIG. 5 illustrates the elimination of a resonant current condition in a compensating capacitor as a result of the thyristor turn off upon the completion of the short gate drive signal of the invention.

The operation of the short-duration gate drive signal of the invention is illustrated in FIG. 5. The Figure shows three instances of a resonant condition on a compensating capacitor and then shut-off of the capacitor in response to the fractional gate drive signal of the invention. This operation protects the capacitor and semiconductors of the SVC 18 from damage, but leaves a shortfall in reactive power compensation.

Figure 6:
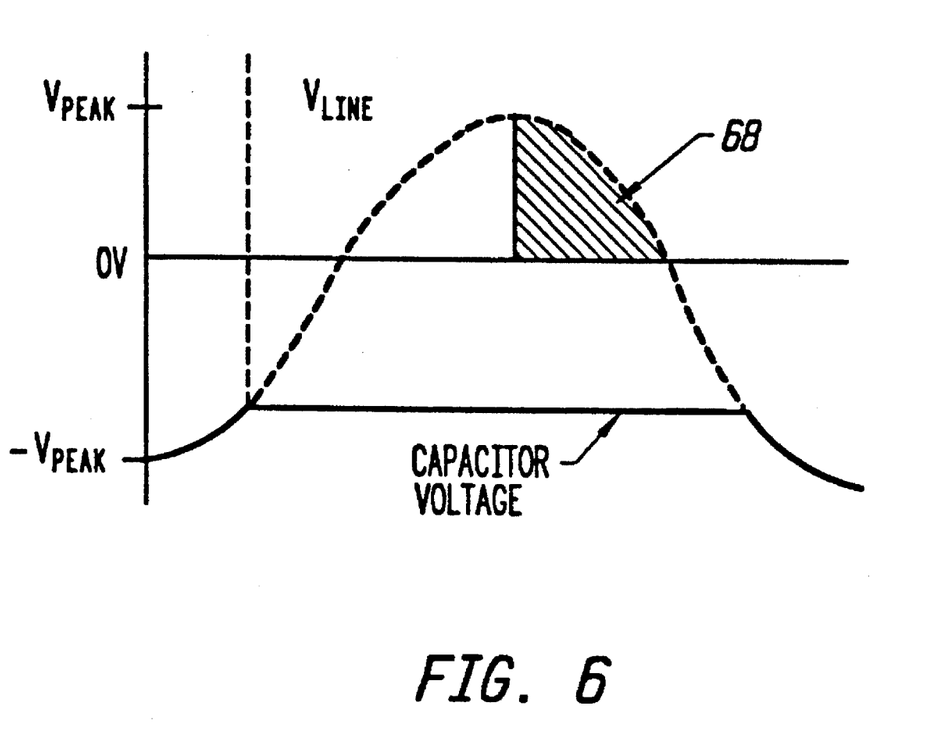
FIG. 6 illustrates the compensating capacitor voltage after a premature shut-off of a compensating capacitor in response to a large amplitude harmonic.

FIG. 6 illustrates the voltage on a compensating capacitor after the capacitor is shut-off from a resonant current condition. The premature shut-off of the capacitor causes the capacitor to be left in a negatively charged state, as shown in FIG. 6.

In accordance with the invention a capacitor polarity circuit 31 is used with the controller 24 to determine the best available control scheme in the event that a capacitor does not conduct throughout a half cycle. The invention identifies this incomplete compensation period whether it was caused by a resonant current in the compensating capacitor, a line voltage harmonic, or the failure of a solid state component. Regardless of the cause, corrective action is taken to account for the un-applied reactive power conditioning of the previous cycle.

Figure 7:
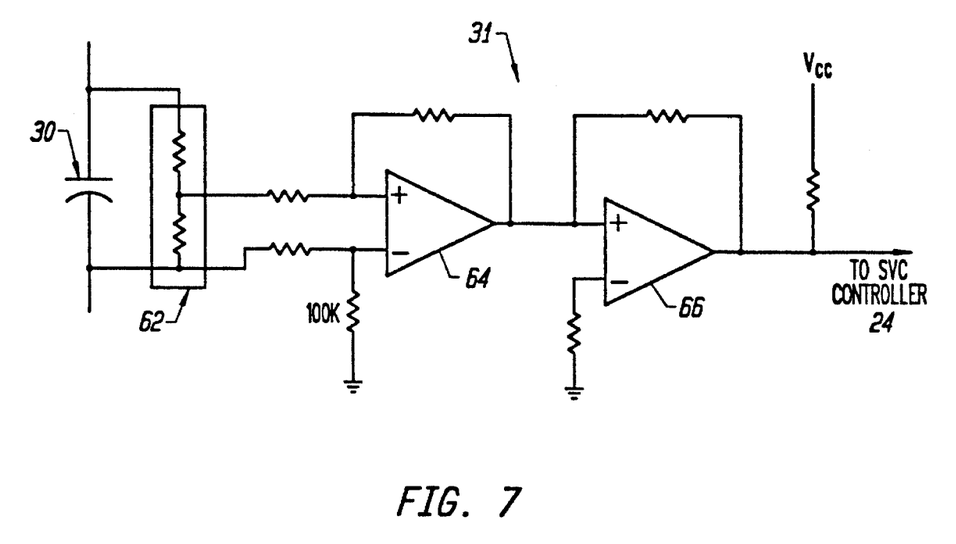
FIG. 7 illustrates the capacitor polarity circuit of the invention.

FIG. 7 illustrates the capacitor polarity circuit 31 of the invention. The capacitor polarity circuit 31 is coupled to a compensating capacitor 30 through a voltage divider 62 that operates to drop the line voltage to a reasonable voltage processing level. The output from the voltage divider 62 is applied to a buffer 64. The buffer 64 provides a high input impedance for the signal from the voltage divider 62. The buffer 64 also inverts the voltage divider signal. The output of the buffer 64 is applied to the positive node of comparator 66. The negative node of comparator 66 is coupled to ground. The resultant comparator output is a logic zero when the capacitor voltage is positive. This condition occurs when the thyristor switch conducts for at least 1/4 of a cycle, in which case it has conducted beyond the gate drive period. The comparator output is a logic one when the capacitor voltage is negative, thereby indicating the premature shutoff of the compensating capacitor. As indicated in FIG. 7, the output of the comparator 66 of the capacitor polarity circuit 31 is sent to the SVC controller 24 of the invention.

The controller 24 preferably samples the capacitor polarity circuit 31 output during a capacitor polarity sampling period 68, which is shown in FIG. 6. The capacitor polarity sampling period 68 must occur between a half cycle and three-quarter of a cycle after the gate drive pulse is indicated. The conduction period is known from the self-synchronizing aspect of the controller 24, which will be discussed below.

It will be appreciated that the capacitor polarity circuit 31 of the invention provides a feedback loop for the controller 24. That is, the controller 24 selectively triggers specific thyristor switches each AC power line cycle. Now, in accordance with the invention, the controller can also determine whether the corresponding thyristor switches remained turned on to provide complete compensation. This information is used to execute the VAR correction control strategy of the invention, which is described in relation to FIGS. 8 and 9.

Figure 8:
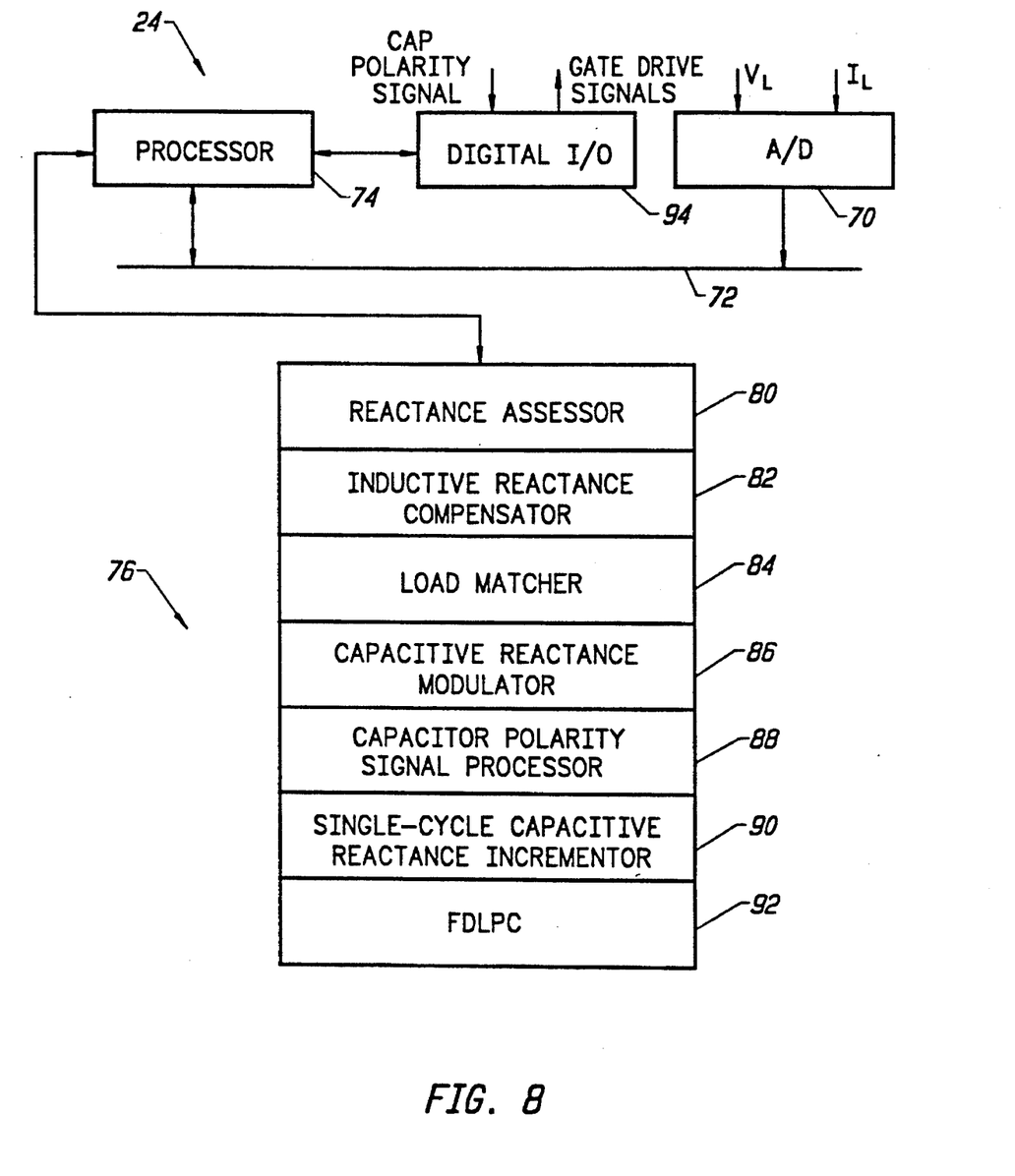
FIG. 8 depicts a digital embodiment of the SVC controller of the invention.

FIG. 8 illustrates a digital embodiment of the controller 24 of the invention. The controller 24 includes digital I/O 94 that receives the capacitor polarity signal from the capacitor polarity circuit 31. The SVC controller 24 also includes an analog-to-digital (A/D) converter 70 that receives a line voltage signal $V_L$ from the voltage divider 26 of FIG. 1, and a line current signal $I_L$ from the current transformer 28 of FIG. 1. These analog signals are converted to digital signals that are applied to a system bus 72. The system bus 72 is in communication with a processor 74. The processor 74 interacts with a memory module 76, which includes a number of stored programs 80–92, as illustrated. The stored programs execute a VAR correction strategy based upon the capacitor polarity signal and calculated reactive VARs. Since the capacitor polarity signal is responsive to resonant line conditions or large amplitude harmonics, the control strategy is tailored for these conditions.

Figure 9:
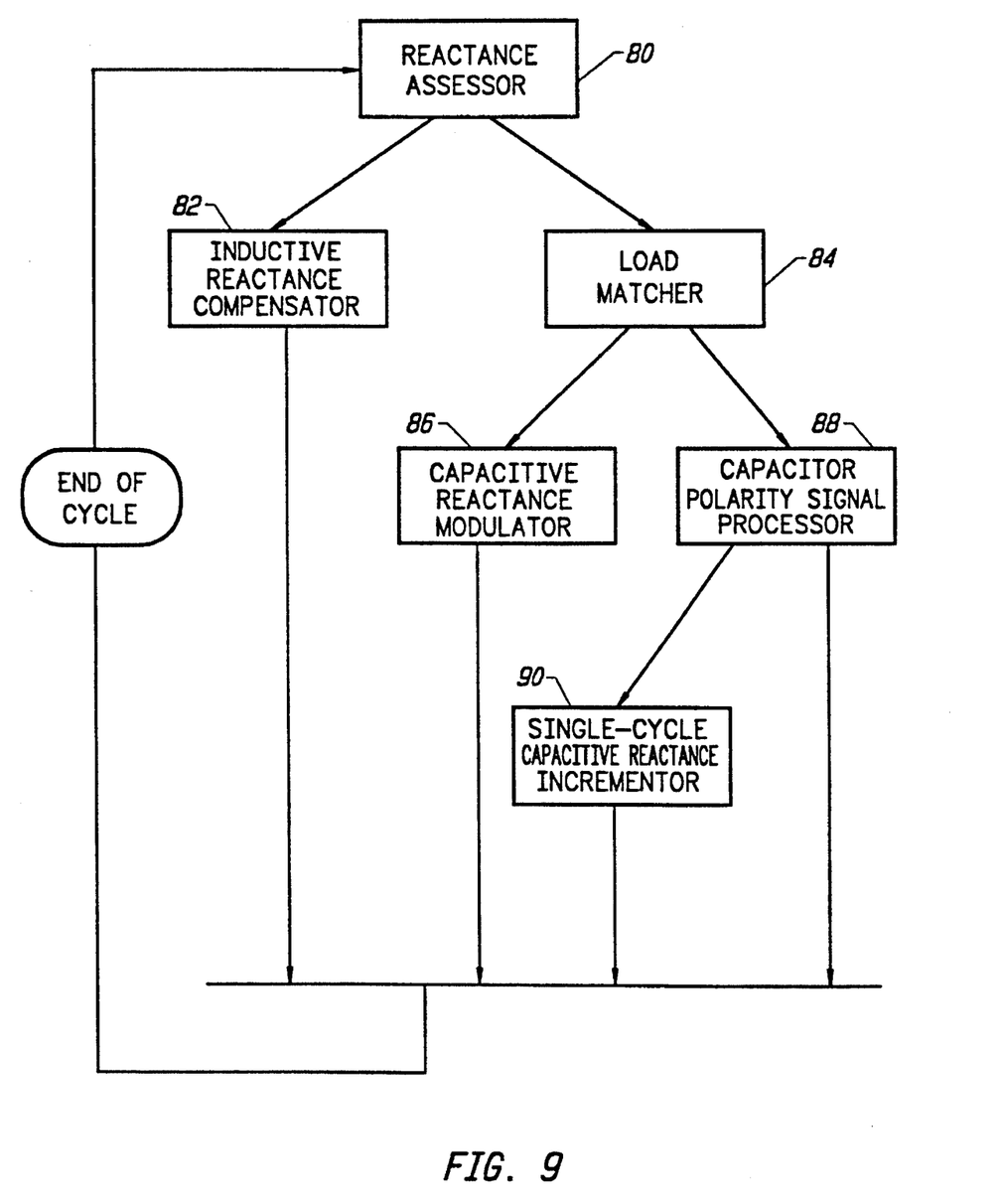
FIG. 9 shows the reactive power compensation strategy executed in accordance with the invention.

The operation of the control strategy is best explained with reference to FIG. 9. FIG. 9 shows a reactance assessor 80. The specific operation of the reactance assessor is described below. For the time being it is only necessary to know that every cycle the reactance assessor 80 determines whether the load reactance is capacitive or inductive. If the load reactance is capacitive,-then an inductive reactance compensator 82 is called. The inductive reactance compensator 82 provides inductive reactance compensation for the next cycle. Based upon the existing capacitive reactance determined by the reactance assessor 80, a value is selected for the compensating inductor 50 of FIG. 2 which will cancel or substantially cancel the existing line capacitive current. Note in this case that the state of the capacitor polarity signal is irrelevant because the controller will not be required to provide capacitive compensation for the next cycle.

If the reactance assessor 80 determines that the load is inductive, then a load matcher 84 is called. The load matcher 84 is used to select a capacitive VAR level that will cancel the existing inductive VARs on the line. For example, in FIG. 2 it can be seen that different step levels of capacitive reactive compensation are available (50 KVAR, 100 KVAR, 200 KVAR, 300 KVAR). The load matcher selects a set of compensating capacitors 30 to provide the required capacitive reactive compensation when the required capacitive reactive compensation has changed from the previous cycle. Afterwards, the capacitive reactance modulator 86 is called. The capacitive reactance modulator 86 will provide a step increase or decrease in the amount of capacitive reactance compensation. That is, it will connect or dis-connect selected compensating capacitors 30 of the SVC 20. Note in this case that the capacitor polarity signal is not used in the power conditioning strategy. This is because an incremental step change of compensating capacitive reactance is taking place, consequently the possible failure of compensation in a previous cycle will be handled through the step change of compensating capacitive reactance in the present cycle.

If the load matcher 84 identifies that the same capacitance level is to be applied in the present cycle as in the previous cycle, then the capacitor polarity signal processor 88 is called. As its name implies, the capacitor polarity signal processor 88 processes the output signal from the capacitor polarity circuit 31. If the capacitor polarity signal from the capacitor polarity circuit 31 indicates that full demanded capacitive compensation was applied during the previous cycle, then no additional capacitive compensation is required in the present cycle. Therefore, processing for this cycle is complete.

On the other hand, if the capacitor polarity signal processor 88 determines that in the previous cycle the compensating capacitor was shut-off prematurely, then the single-cycle capacitive reactance incrementor 90 is called. The single-cycle capacitive reactance incrementor 90 increments the capacitance demand by one step. That is, a step increment in capacitance is selected to compensate for the capacitive compensation that was missed in the previous cycle. For instance, relying upon the device of FIG. 2, if the capacitance demand from the previous step was 50 KVAR, corresponding to switched capacitor 30A, then the next cycle would switch capacitor 30B (100 KVAR).

Before incrementing the capacitive demand, the single-cycle capacitive reactance incrementor 90 checks for two conditions. First, if an increment of the capacitive demand exceeds the total capacitive compensation limit of the system (exceeds 650 KVARs in FIG. 2), then the capacitive demand remains at the level of the previous cycle. Second, the capacitive demand remains at the level of the previous cycle if the absolute magnitude of the difference between the capacitive demand (a capacitive VAR level) and the load VAR level is greater than the load VAR level. In other words, if the compensation demand will result in a greater VAR value than the existing VAR value to be compensated, then the capacitor demand from the previous cycle is used, not the incremented capacitor value.

Those skilled in the art will appreciate that the controller 24 of the invention is highly advantageous because it provides appropriate reactive power conditioning even in the presence of premature compensating capacitor shut-off. The polarity-based VAR correction controller of the invention has now been described. Attention presently turns to a preferable self-synchronizing controller that is used to fire the thyristors 37 of the SVC 18.

As indicated above, each of the compensating capacitors 30 are peak negatively charged each cycle. Thus, for this particular configuration of the invention, the firing system of the SVC controller 24 must activate the thyristor strings 32 during the negative peak of the line voltage. Failure to fire the thyristors strings 32 at this precise moment may result in damage to the thyristors 37. Thus, the SVC controller 24 of the invention includes a frequency domain line parameter calculator (FDLPC) 92. The FDLPC 80 constitutes a set of operations that are executed by the processor 74 to produce digital firing signals that are sent via digital I/O 102 to the switch gate drive circuits 22 shown in FIG. 1.

The operations associated with the FDLPC 80 are as follows. The line voltage $V_L$ and the line current $I_L$ are continuously sampled by the A/D converter 70. Preferably, the A/D converter 70 includes a buffer memory. Data from the buffer memory is periodically passed over the system bus 72 to the processor 74. For example, one block of data may be acquired by the A/D converter 70 and then be passed to the processor 74. Thereafter, the processor 74 processes the data as will be described below, while the A/D converter continues to accumulate data for the next block. The operation is then repeated. In this manner, no loss of input data occurs and the processor data-acquisition overhead is minimized.

Each block of data is processed in accordance with the frequency domain line parameter calculator (FDLPC) 80 of the invention. The FDLPC 80 repetitively performs a single-frequency 60 Hz Discrete Fourier Transform (DFT) on successive blocks of acquired data. The DFT yields two frequency domain parameters: magnitude and phase angle. Only the phase angle of the voltage DFT is used to determine when to fire the solid state switches. While DFTs have been used in the prior art to obtain signal magnitude information, the use of the phase angle information of the DFT for determining a solid state switch firing instant is believed to be novel.

The problem with using a DFT to obtain firing signal information arises because the firing signal must be precisely timed, and therefore in the time domain, whereas the DFT operates in the frequency domain. All known prior art relies on an external synchronization signal, based in one fashion or another on the inherent timing relationship among the three phases of the power line, to determine zero crossings. In single phase systems, a phase-locked loop is used. An objective of this invention is to operate on a single phase, without reference to the three-phase line, and therefore without any external synchronization information, and without extra hardware such as phase-locked loops, to detect the zero crossings of the fundamental voltage signal.

Figure 10:
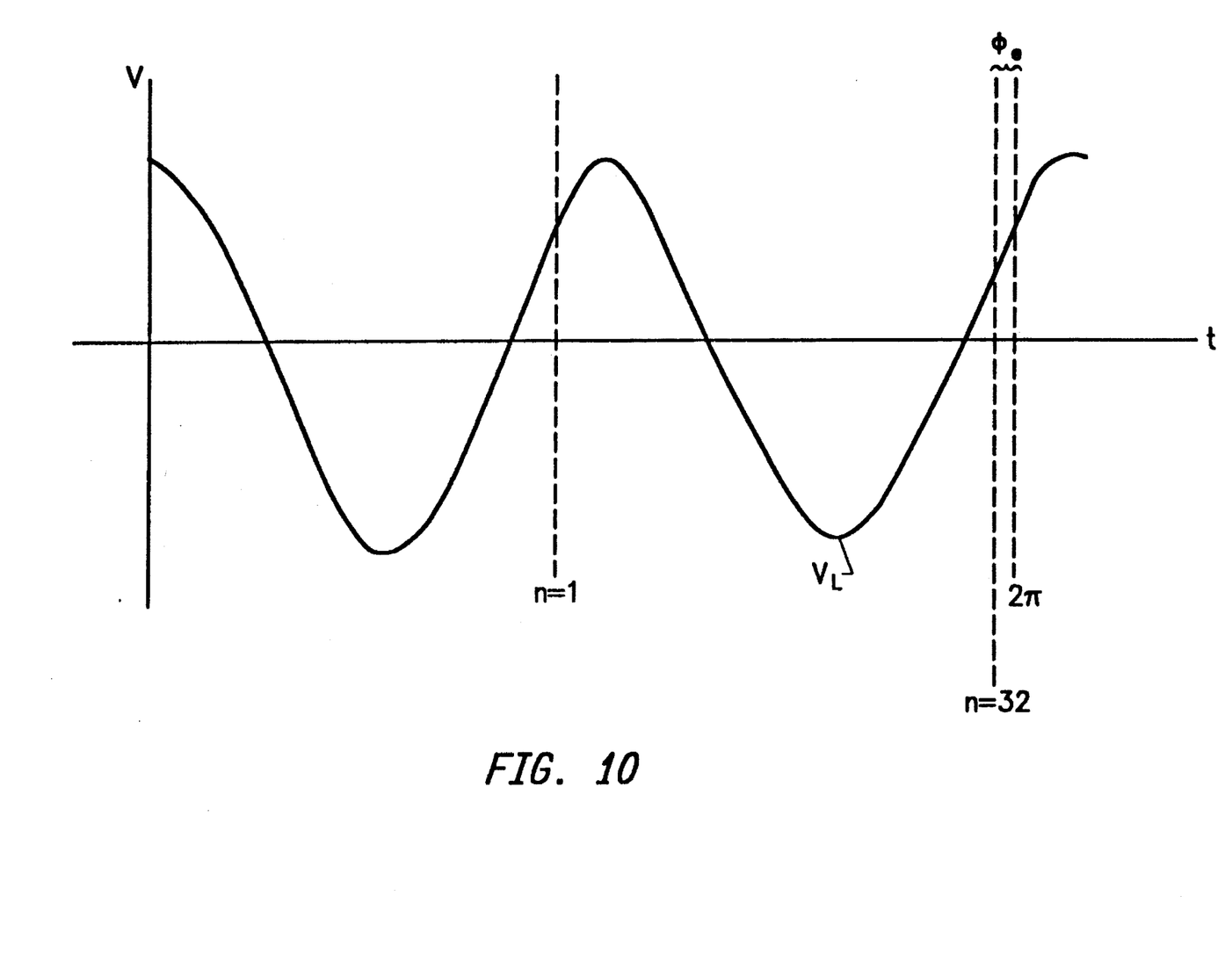
FIG. 10 illustrates the phase slip problem addressed by the self-synchronizing SVC controller of the invention.

The frequency domain processing of the invention will be described in relation to the line voltage $V_L$. FIG. 10 illustrates a line voltage signal $V_L$. At the line marked N=1 the A/D converter 70 begins sampling the line voltage for that cycle. Thirty-two samples of the line voltage are acquired in this example. However, a different number of samples may be taken as along as the Nyquist sampling criterion is satisfied. Thus, the final sample of the cycle is taken at the line in FIG. 10 marked as N=32.

Each line voltage sample is multiplied by a sine coefficient and a cosine coefficient. The respective products are then accumulated as separate sums. The resultant sum of cosine terms is proportional to the real component of the voltage phasor, whereas the resultant sum of sine-terms is proportional to the imaginary component of the voltage phasor. Thus, in accordance with the invention, the fundamental of the line voltage is constructed according to the following operation:

$$V_{real} = V_1\cos(2\pi fT) + V_2\cos[2*(2\pi fT)] + \ldots V_N\cos[N*(2\pi fT)]$$ (Equation 1)

$$V_{imag} = V_1\sin(2\pi fT) + V_2\sin[2*(2\pi fT)] + \ldots V_N\sin[N*(2\pi fT)]$$ (Equation 2).

In the above equations, f is the DFT frequency, T is the time interval between samples and N is the total number of samples in each summation. V1, V2, ... and $V_N$ are the line voltage samples. Equations (1) and (2) are calculated at a single frequency, f, which by way of example will be assigned 60 Hz, the nominal power signal frequency in the United States. Note that this technique is insensitive to line harmonics.

To ideally implement the DFT using equations (1) and (2), the product of the constant parameters f, N and T will exactly equal 1. The value of N is set to 32 which enables highly accurate 60 Hz DFT data to be obtained. Consequently, for a line frequency of 60 Hz, the value of T equals 520.833 microseconds, but in practice a 520 microsecond value is used due to limitations in the sampling hardware. This results in a discrepancy of 26.666 microseconds every 60 Hz cycle. This discrepancy is called a sampling-error discrepancy, denominated $\phi_e$, and is illustrated in FIG. 10.

In accordance with the invention, the previously calculated real and imaginary voltage terms are used to calculate the phase angle, $\phi_V$, of the line voltage phaser. This operation is performed according to the following equation:

$$\phi_V = \arctan(V_{imag}/V_{real})$$ (Equation 3).

The voltage phaser phase angle $\phi_V$ can be considered the angular displacement of the line voltage's fundamental frequency component sinusoid (which is shown as $V_L$ in FIG. 11) from a time-shifted cosine function (which is shown as $V_S$ in FIG. 11) of the same frequency but having its origin coinciding with the first sample instant.

The calculated phase angle, $\phi_V$, will not be constant from cycle to cycle since the summations of equations (1) and (2) are not explicitly synchronized to the line frequency. In other words, the sampling error discrepancy shown in FIG. 10 causes the calculated phase angle, $\phi_V$, to continually change by 0.01 radians per cycle, which is the angle corresponding to the 26.666 microsecond discrepancy described above.

As previously indicated, it is necessary to fire the thyristors when the voltage across them is at or near zero, otherwise a large in-rush current will be produced that can damage the thyristors 37 and capacitors 30. Since the calculated phase angle is continuously changing, a synchronized approach to thyristor firing is not available. Instead, a self-synchronizing operation must be executed in accordance with the invention. This self-synchronization operation involves the use of the calculated phase angle, $\phi_V$, and an offset angle, as will be described below.

As previously discussed, the arrangement of the solid state devices 20 causes the capacitors to be negatively charged each cycle. Therefore, in this configuration, it is necessary to fire the thyristors at the negative peak line voltage. This occurs at an angular displacement, or offset angle, of π radians relative to a cosine function originating at the first sample instant. Since this point occurs at the negative peak of the reference function for the DFT voltage phase angle, it is necessary to add the offset angle of π radians to the phase angle, $\phi_V$, calculated by equation (3) to obtain the displaced phase angle, $\phi_D$, also called the frequency domain firing angle. This operation may be defined as follows:

$$\phi_D = \phi_V + \pi$$ (Equation 4).

Figure 11:
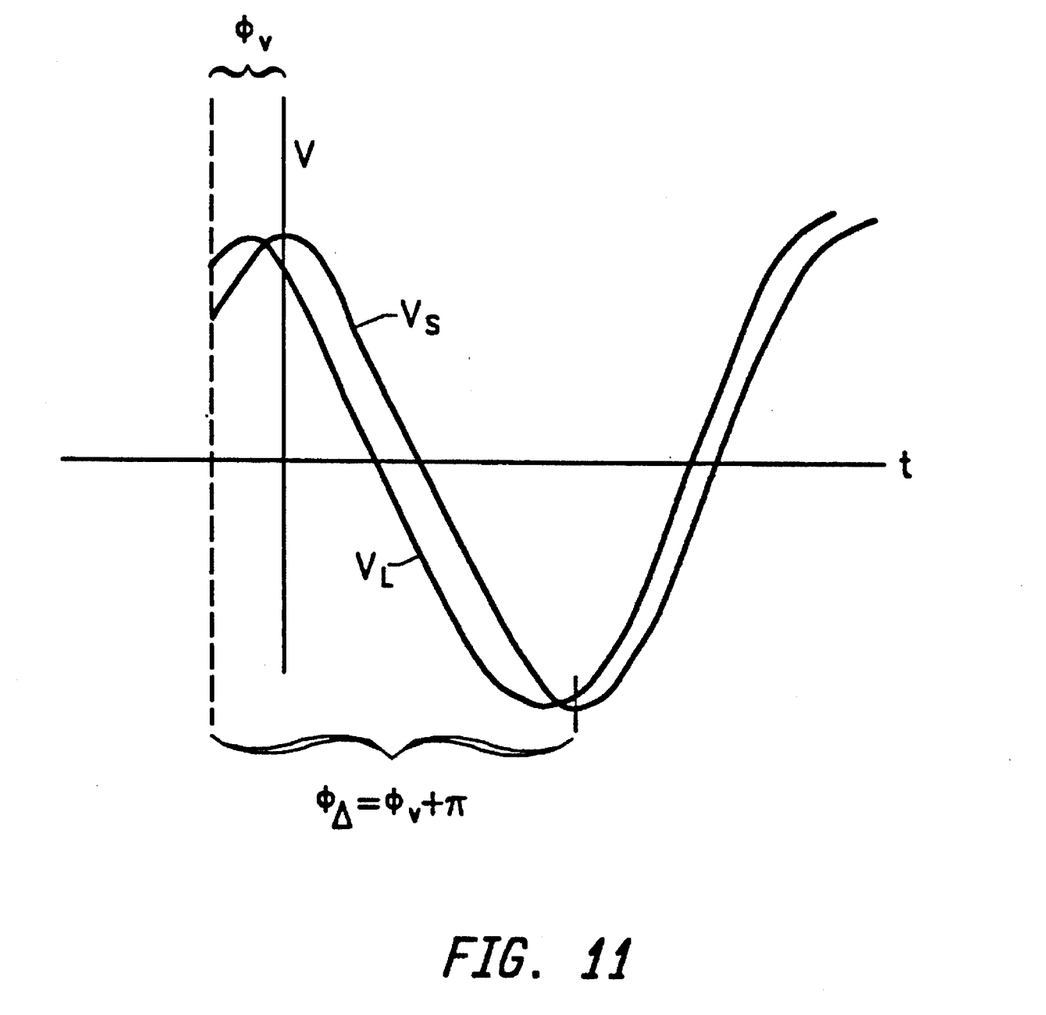
FIG. 11 illustrates the phase compensation technique of the self-synchronizing SVC controller of the invention.

The displaced phase angle $\phi_D$ is illustrated in FIG. 11. Note that the displaced phase angle $\phi_D$ is directly proportional to time since the nominal frequency of the line voltage is constant. At 60 Hz, for example, the period of 1 cycle equals 16.66 milliseconds. Therefore, the displaced phase angle of the line voltage is used to predict the next time instant at which the fundamental component of the line voltage will be at a specific value. Specifically, a firing time, $T_F$, when the voltage sinusoid will be at its most negative value for correct thyristor firing, is defined as follows:

$$T_F = \phi_D/(2\pi 60)$$ (Equation 5)

Equation 5 requires that the displaced phase angle, $\pi_D$, be a positive quantity, not greater than $2\pi$ radians. Since the angle is modulo $2\pi$, it is reduced, when necessary, to a value between 0 and $2\pi$ radians. Note that the results of this teaching are not affected by line harmonics.

The value obtained from equation (5) is used to set an internal timer in processor 74. When the timer expires, the processor 74 generates digital firing signals that are sent to the digital I/O 102. From the digital I/O 102, the signals are processed by the switched gate drive circuits 22 and eventually fire the solid state switches 21.

The firing time $T_F$ is adjusted to account for the computation time associated with the foregoing calculations. The thyristors are able to be fired every cycle regardless of the point in time at which the last sample of the previous cycle is taken.

The firing system of the SVC controller 24 of the invention has now been described. Attention presently turns to the other operations that are performed by the frequency domain line parameter calculator (FDLPC) 80 of the invention. The magnitude of the line voltage phase may be calculated from the $V_{real}$ and $V_{imag}$ quantities as follows:

$$V_{mag} = [(V_{real})^2 + (V_{imag})^2]^{1/2}$$ (Equation 6)

It should be appreciated that the identical calculations can be made for the line current $I_L$, to yield the corresponding quantities, $I_{imag}$, $I_{real}$, $I_{mag}$ and $\phi_I$. When this is done, a power factor angle $\phi_{PF}$ may be calculated as follows:

$$\phi_{PF} = \phi_V - \phi_I$$ (Equation 7)

The power factor (PF) may then be calculated as follows:

$$PF = \cos(\phi_{PF})$$ (Equation 8)

Finally, the reactive power may then be calculated as follows:

$$Q = V_{mag}I_{mag}\sin(PF)$$ (Equation 9)

This operation is performed by the reactance assessor 88, which will be discussed below.

These additional quantities derived by the frequency domain line parameter calculator (FDLPC) 80 may be used in conjunction with the control strategy executed by the SVC controller 24 of the invention.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, the invention is disclosed in relation to negatively charged capacitors. Slight modifications to the foregoing techniques are required when a different physical configuration is used.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A static VAR compensator, comprising:

an output node connected to a power line carrying a power signal;

a reactive power compensation element connected to said output node, including
   a compensating capacitor, and
   a plurality of switching devices for selectively connecting said compensating capacitor to said output node for a predetermined compensation period, said predetermined compensation period being transformed into an incomplete compensation period under certain physical conditions;

a compensation assessment circuit connected to said reactive power compensation element; and a controller connected to said compensation assessment circuit to identify said incomplete compensation period and to produce control signals for said plurality of switching devices of said reactive power compensation element such that said reactive power compensation element conditions said power signal to account for said incomplete compensation period.

2. The static VAR compensator of claim 1 wherein said compensation assessment circuit is a capacitor polarity circuit which includes a comparator to compare the voltage level of said compensating capacitor with a chosen voltage level to generate a capacitor polarity signal.

3. The static VAR compensator of claim 2 wherein said capacitor polarity circuit includes an inverting buffer connected between said comparator and said compensating capacitor.

4. The static VAR compensator of claim 3 wherein said capacitor polarity circuit further includes a voltage divider connected between said inverting buffer and said compensating capacitor.

5. The static VAR compensator of claim 1 wherein said controller selects an initial compensation level that will provide capacitive reactive compensation for existing inductive reactive power of said power signal and then modifies said initial compensation level, in response to said incomplete compensation period, into a final compensation level corresponding to said control signals.

6. The static VAR compensator of claim 5 wherein said controller generates said control signals to force said reactive power compensation element to produce reactive power compensation corresponding to the reactive power compensation lost from said incomplete compensation period.

7. A static VAR compensator, comprising:

a power line output node for connection to a power line carrying a power signal;

a parameter measurement circuit to continuously sample said power signal and obtain a measured power signal;

a plurality of compensating capacitors, with associated increment VAR values;

a plurality of capacitor polarity circuits, each of said capacitor polarity circuits being connected to one of said plurality of compensating capacitors and generating a capacitor polarity signal;

a plurality of thyristor strings, each of said thyristor strings connecting a selected compensating capacitor of said plurality of compensating capacitors to said power line output node to provide capacitive reactive power conditioning to said power signal for a complete compensation period of one-half cycle of said power signal, said complete compensation period being transformed into an incomplete compensation period in response to certain physical conditions;

a plurality of gate drive circuits corresponding to said plurality of thyristor strings to fire said plurality of thyristor strings; and a controller connected to said parameter measurement circuit, said plurality of capacitor polarity circuits, and said plurality of gate drive circuits to identify said incomplete compensation period of one or more of said plurality of compensating capacitors in a previous cycle of said power signal and to produce gate drive signals to be applied to said gate drive circuits to provide capacitive reactive compensation in one or more subsequent cycles of said power signal to account for said incomplete compensation period.

8. The static VAR compensator of claim 7 wherein each of said plurality of capacitor polarity circuits includes a comparator to compare the voltage level of a selected compensating capacitor with a chosen voltage level to generate said capacitor polarity signal.

9. The static VAR compensator of claim 8 wherein each of said plurality of capacitor polarity circuits further includes an inverting buffer connected between said comparator and said selected compensating capacitor.

10. The static VAR compensator of claim 9 wherein each of said plurality of capacitor polarity circuits further includes a voltage divider connected between said inverting buffer and said selected compensating capacitor.

11. The static VAR compensator of claim 7 wherein said controller reads said capacitor polarity signal in a predetermined capacitor polarity sampling period.

12. The static VAR compensator of claim 1 wherein said controller generates fractional gate drive signals between one-sixteenth ($\frac{1}{16}$) of a cycle of said power signal and one-quarter ($\frac{1}{4}$) of a cycle of said power signal.

13. The static VAR compensator of claim 12 wherein said controller generates factional gate drive signal of approximately one-eighth ($\frac{1}{8}$) of a cycle of said power signal.

14. The static VAR compensator of claim 7 wherein said controller selects an initial compensation level that will provide capacitive reactive compensation for existing inductive reactive power of said power signal and then modifies said initial compensation level, in response to said incomplete compensation period, into a final compensation level corresponding to said control signals.

15. The static VAR compensator of claim 14 wherein said controller generates said control signals for said gate drive circuits to produce reactive power compensation corresponding to the reactive power compensation lost from said incomplete compensation period.

16. A method of operating a static VAR compensator including a power line output node for connection to a power line carrying a power signal, a plurality of compensating capacitors, a plurality of thyristor strings each of said thyristor strings connecting a selected compensating capacitor of said plurality of compensating capacitors to said power line output node to provide capacitive reactive power conditioning to said power signal, and a plurality of gate drive circuits corresponding to said plurality of thyristor strings to fire said plurality of thyristor strings, the method comprising the steps of:

provid­ing a plurality of compensation assessment circuits to generate compensation assessment output signals when one or more of said plurality of compensating capacitors provides incomplete reactive compensation to said power signal in a first cycle; and generating gate drive signals, for application to said plurality of gate drive circuits in a second cycle, that force said plurality of compensating capacitors to provide reactive compensation in response to said incomplete reactive compensation to said power signal in said first cycle.

17. The method of claim 16 wherein said generating step includes the step of generating fractional gate drive signals between one-sixteenth (1/16) of a cycle of said power signal and one-quarter (1/4) of a cycle of said power signal.

18. The method of claim 17 wherein said generating step includes the step of generating fractional gate drive signals of approximately one-eighth (1/8) of a cycle of said power signal.

19. The method of claim 18 wherein said generating step includes the steps of:

selecting an initial compensation level that will provide reactive compensation for existing inductive reactive power of said power signal; and modifying said initial compensation level, in response to said incomplete reactive compensation, to select a final compensation level that is executed by said gate drive signals.

20. The method of claim 19 wherein said modifying step selects said final compensation level to produce reactive power compensation corresponding to the reactive power compensation lost from said incomplete reactive compensation.

* * * * *